(12) United States Patent  
Kim et al.

(10) Patent No.: US 9,185,588 B2  
(45) Date of Patent: Nov. 10, 2015

(54) METHOD AND DEVICE FOR SENDING AND RECEIVING A BROADCAST CONTROL CHANNEL IN A MOBILE COMMUNICATION SYSTEM

(75) Inventors: Sang Bum Kim, Seoul (KR); Kyeong In Jeong, Hwaseong-si (KR); Soeng Hun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 259 days.

(21) Appl. No.: 13/391,975

(22) PCT Filed: Aug. 24, 2010

(86) PCT No.: PCT/KR2010/005613  
§ 371 (c)(1),  
(2), (4) Date: Feb. 23, 2012

(87) PCT Pub. No.: WO2011/025205  
PCT Pub. Date: Mar. 3, 2011

(65) Prior Publication Data  
US 2012/0157090 A1 Jun. 21, 2012

(30) Foreign Application Priority Data  
Aug. 24, 2009 (KR) .................. 10-2009-0078333

(51) Int. Cl.  
*H04B 7/00* (2006.01)  
*H04W 24/08* (2009.01)  
*H04W 48/10* (2009.01)  
*H04W 52/32* (2009.01)  
*H04W 48/12* (2009.01)

(52) U.S. Cl.  
CPC .............. *H04W 24/08* (2013.01); *H04W 48/10* (2013.01); *H04W 48/12* (2013.01); *H04W 52/322* (2013.01)

(58) Field of Classification Search  
CPC ..... H04W 24/08; H04W 48/12; H04W 24/10; H04W 24/02; H04W 28/06; H04W 76/02; H04W 52/322; H04W 52/04  
USPC .................. 455/423, 67.11, 68, 69, 515, 522  
See application file for complete search history.

(56) References Cited

U.S. PATENT DOCUMENTS

| 6,438,386 | B2 * | 8/2002 | Joshi et al. ............... 455/515 |
| 6,718,158 | B1 * | 4/2004 | Suonvieri ................. 455/9 |
| 6,993,352 | B2 * | 1/2006 | Lundby ................... 455/466 |
| 2002/0119757 | A1 | 8/2002 | Hamabe |
| 2003/0119557 | A1 | 6/2003 | Lundby |
| 2003/0235160 | A1 | 12/2003 | Saifuddin |

FOREIGN PATENT DOCUMENTS

| CN | 1377200 A | 10/2002 |
| CN | 1620834 A | 5/2005 |

(Continued)

OTHER PUBLICATIONS

F. L. Piccolo, "A New Cooperative Localization Method for UMTS Cellular Networks", 2008 IEEE Global Telecommunications Conference, GLOBCOM, Nov. 30, 2008.

(Continued)

*Primary Examiner* — Olumide T Ajibade Akonai  
(74) *Attorney, Agent, or Firm* — Jefferson IP Law, LLP

(57) ABSTRACT

The present invention relates to a method and device for automatically optimizing the send parameters in a mobile communication system wherein, in order to optimize the BCCH reception performance, a terminal stores information relating to BCCH reception failure reasons or the number of instances of packet combination for BCCH reception, and this information is reported to a base station.

15 Claims, 15 Drawing Sheets

(56) References Cited

FOREIGN PATENT DOCUMENTS

| CN | 1672343 A | 9/2005 |
|---|---|---|
| KR | 10-2001-0050301 A | 6/2001 |
| KR | 10-2009-0023736 A | 3/2009 |
| WO | 2008-079222 A1 | 7/2008 |

OTHER PUBLICATIONS

3GPP TS 48.052 v8.0.0, "3rd Generation Partnership Project; Technical Specification Group GSM EDGE Radio Access Network; Base Station Controller—Base Transceiver Station(BSC-BTS) interface; Interface principals (Release 8)", 2008.12.

* cited by examiner

METHOD AND DEVICE FOR SENDING AND RECEIVING A BROADCAST CONTROL CHANNEL IN A MOBILE COMMUNICATION SYSTEM

BACKGROUND OF THE INVENTION

1. Field of the Invention

The present invention relates to a method and device for optimizing transmission parameters in order to improve Broadcast Control Channel (BCCH) reception performance in such a way that a terminal retains BCCH reception failure reason or a number of packet combinations for BCCH reception and reports this to a base station in a mobile communication system.

2. Description of the Related Art

Mobile communication systems have developed to provide the subscribers with voice communication services on the move. With the rapid advance of technologies, the mobile communication systems have evolved to support high speed data communication services as well as the standard voice communication services.

Recently, as the next generation mobile communication system of the $3^{rd}$ Generation Partnership Project (3GPP), Long Term Evolution (LTE) is under development. The LTE system is a technology for realizing high-speed packet-based communication at about 100 Mbps, aiming at commercialization in around 2010.

With the evolution of the LTE standard, it is discussed how to configure and optimize system parameters automatically in building a radio network. Such a technology is referred to as Self-Organizing Networks (SON). SON is a network which optimizes parameters related to the system resources of a cell automatically. That is, the system resource-related parameters are automatically optimized based on the data received from User Equipment or statistical values acquired through self-management of the network. A mobile communication system is configured with a plurality of system parameters that are set suitably to optimize reception performance on multiple channels. In order to achieve this purpose, it should be performed first to measure the properties of the signals on the channels within the service area of the radio network.

DISCLOSURE OF INVENTION

Technical Problem

In order to optimize the system information of the conventional mobile communication system, it should be performed to do the measurement repeatedly with the measurement equipment carried on a vehicle which is time-consuming and burdensome. The measurement result is analyzed and used to configure the system parameters of the base stations or base station controllers. The drive test should be performed for building a new network and whenever the network is reconfigured due to various reasons. Such cumbersome drive tests increases initial radio network building and maintenance costs and unnecessarily time-consuming. There is therefore a research conducted on SON to save time and labor for Drive Test, data analysis, and manual configuration.

Solution to Problem

In accordance with an aspect of the present invention, a broadcast control channel transmission apparatus of a base station includes transmitting a broadcast control channel according to preconfigured transmission parameters; collecting log information indicating whether the broadcast control channel is received successfully; and reconfiguring the transmission parameters by analyzing the log information.

In accordance with another aspect of the present invention, a broadcast control channel transmission apparatus of a base station includes a broadcast control channel generator for generating a broadcast control channel according to preconfigured transmission parameters; a transceiver for transmitting the broadcast control channel and receiving log information indicating whether the broadcast control channel is received successfully; and a log information analyzer for collecting and analyzing the log information to reconfigure the transmission parameters.

In accordance with another aspect of the present invention, a broadcast control channel reception method of a terminal includes recording, when a broadcast control channel transmitted by a base station according to preconfigured transmission parameters is received, log information indicating whether the broadcast control channel is received successfully; and feeding back the log information to the base station by analyzing the log information to reconfigure the transmission parameters.

In accordance with still another aspect of the present invention, a log information storage for recording log information according to whether the broadcast control channel is received successfully; and a transceiver for receiving the broadcast control channel and analyzing and feeding back the log information to the base station for reconfiguration of the transmission parameters.

Advantageous Effects

According to the present invention, a UE records information on the BCCH reception failure reason or a number of packet combination times for receiving BCCH and reports the information to the eNB to optimize transmission parameters automatically, resulting in optimization of BCCH reception performance in a mobile communication system.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Broadcast Control Channel (BCCH) is one of logical channels of the LTE mobile communication system and used to broadcast system information. The system information is the information necessary for establishing a connection between a terminal and base station and can be divided into Master Information Block (MIB) and System Information Block (SIB). MIB includes essential physical information such as frequency band and System Frame Number (SFN). There can be SIB1 to SIB11 depending on the information to be carried. SIB1 carries cell selection and System Information Scheduling information, SIB2 carries common and shared channel information. SIB3 to SIB8 carry infra-frequency, inter-frequency, and inter-RAT cell reselection information. SIB9 carries HeNB ID, and SIB10 and SIB11 carry Earthquake and Tsunami Warning System (ETWS) alarm information.

Figure 1:
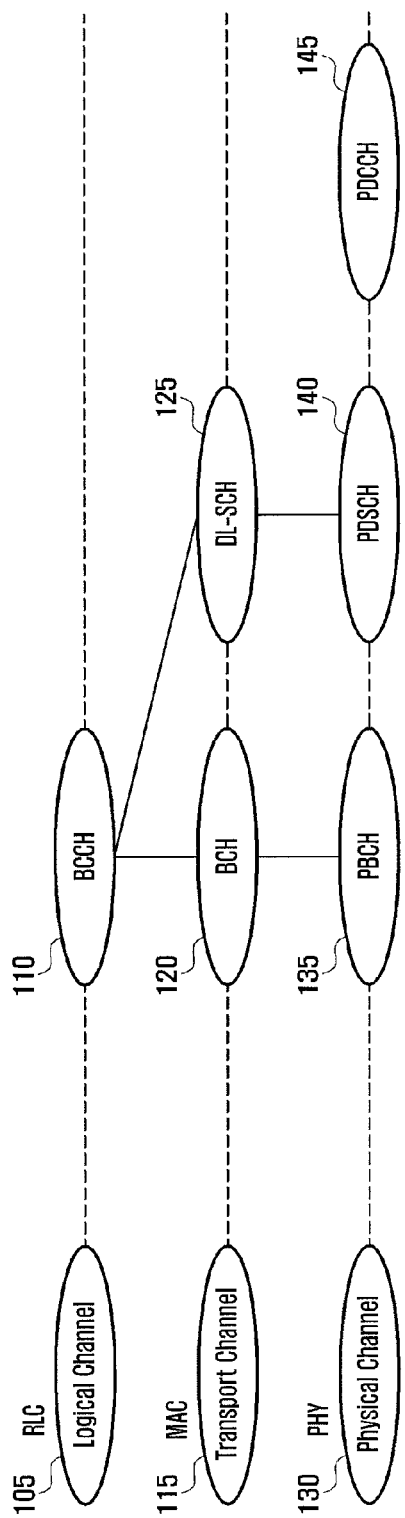
FIG. 1 is a diagram illustrating channel mapping between BCCH and low layer channels.

FIG. 1 is a diagram illustrating channels of low layers related to BCCH.

Referring to FIG. 1, the logical channel 105 is used for packet exchange between RLC and MAC layers, and the transport channel 115 is used for packet exchange between MAC and PHY layers. The physical channel 130 is used for transmitting/receiving packets over radio medium. The system information broadcast on BCCH 110 of the logical channels is categorized according to its property and transmitted to terminals connected to the eNB via low layer channels. The MIB is carried in the Broadcast Channel (BCH) 120 as one of the transport channels. The SIB is carried in Downlink Shared Channel (DL-SCH) 125 as one of the transport channels. The BCH 120 and DL-SCH 125 map to the Physical Broadcast Channel (PBCH) 135 and Physical Downlink Shared Channel (PDSCH) 140, respectively. The Physical Downlink Control Channel (PDCCH) 145 carries the scheduling information of SIB transmitted on the radio resource of PDSCH 140. Accordingly, the PDCCH 145 should be decoded accurately to obtain SIB.

Figure 2:
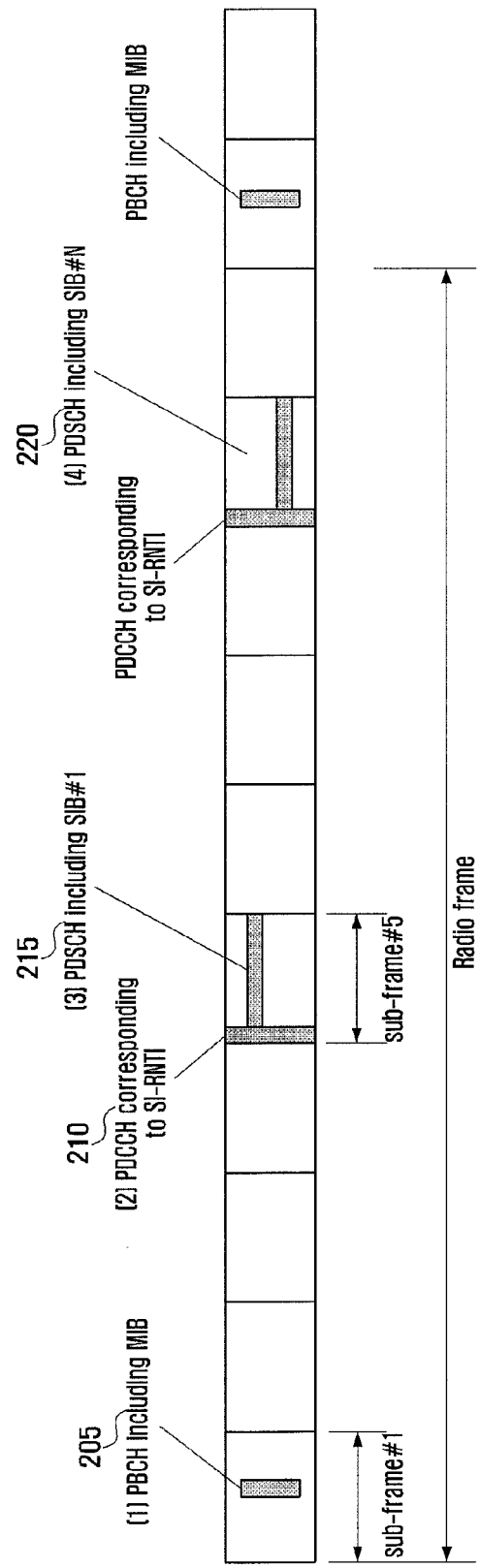
FIG. 2 is a diagram illustrating a procedure of receiving MIB and SIB.

FIG. 2 is a diagram illustrating a procedure of receiving MIB and SIB.

Referring to FIG. 2, the PBCH 205 is transmitted on 72 subcarriers centered around the center of the frequency band and carries MIB information. The MIB is transmitted at the period of 40 ms in which the same information repeats every 10 ms in time diversity. The resource block information of the PDSCH 215 and 220 carrying SIB is carried on the PDSCH 210. In the PDCCH 210 which is CRC checked with SI-RNTI carries scheduling information of PDSCH 215 and 220, i.e. on the frequency axis of SIB1 to SIB11. The SIB1 215 repeats every 80 ms similar to the MIB and is transmitted in the fifth subframe of a radio frame. The SIB1 carries the scheduling information of the SIB2 to SIB11 on the time axis. Accordingly, it is possible to decode the SIB2 to SIB11 using the scheduling information provided in the PDCCH 210 and SIB1. That is, in order to acquire accurate system information on the BCCH, it is necessary to decode all of the physical channels of PBCH 205, PDSCH 215 and 220, and PDCCH 210 correctly.

The present invention relates to a method and apparatus for optimizing transmission parameters automatically in such a way that a terminal retains BCCH reception failure reason and information on the combination times for BCCH reception and reports these to the base station, resulting in optimization of BCCH reception performance in a LTE mobile communication system. The present invention proposes specific information-saving time of a terminal, information to be stored, and terminal and base station operations for BCCH transmission optimization.

Even when the terminal has received downlink synchronization information successfully but failed receiving BCCH in a predetermined time, the log information is stored. At this time, the log information includes current cell information, current location information, and measurement informations of neighbor cells. As aforementioned, however, since several physical channels are involved, additional log information is necessary for taking notice of the properties of the physical channels. By taking the new saving time and log information into consideration, it is possible to optimize the BCCH reception performance. The first embodiment is directed to the log information configured newly, and the second embodiment to log information and new-saving time point of the log information. The third embodiment proposes a method for using the log information of the terminal with mobility without restriction by log information forwarding among base stations.

First Embodiment

Figure 3:
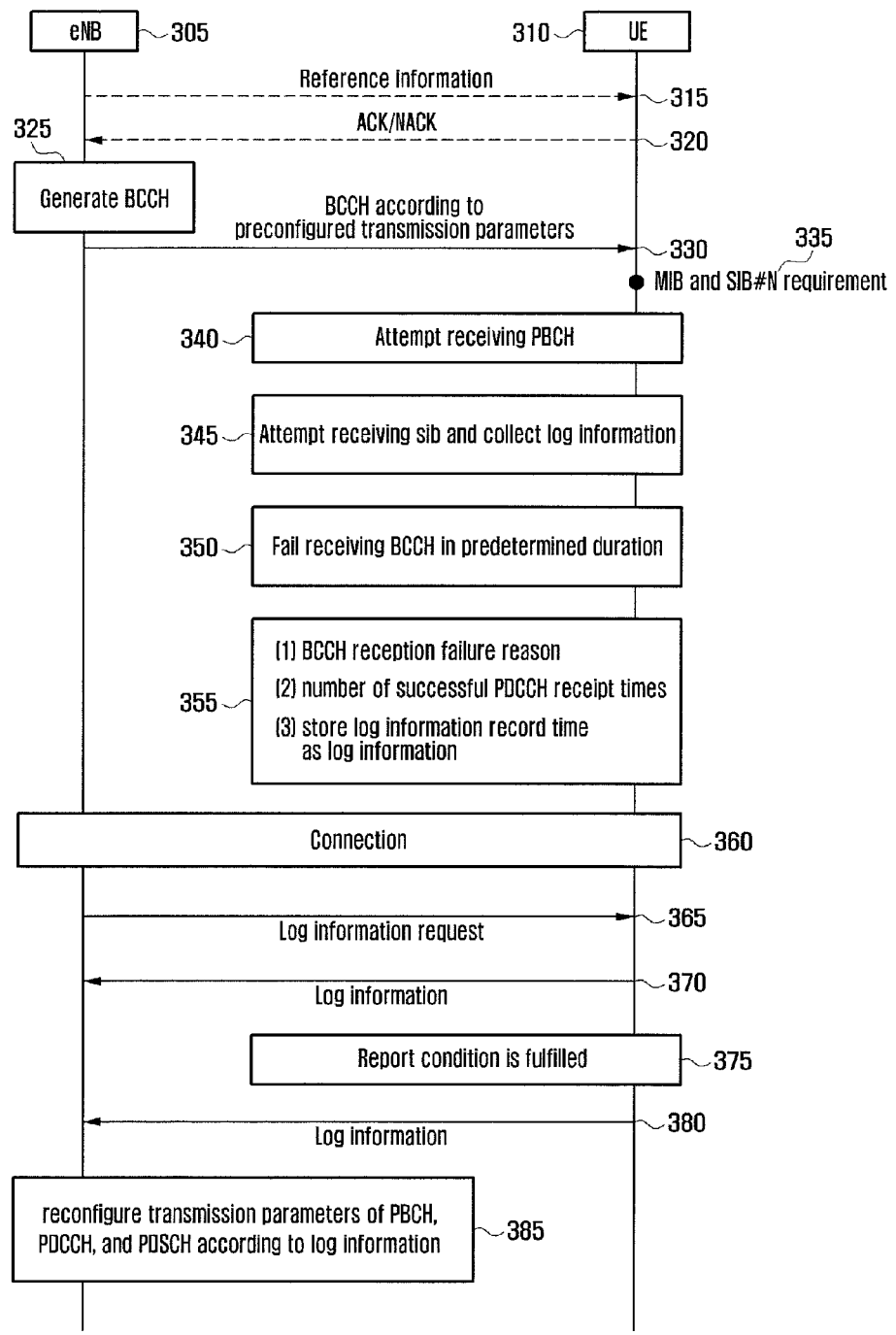
FIG. 3 is a diagram illustrating entire procedure according to the first embodiment of the present invention.

FIG. 3 is a diagram illustrating entire procedure according to the first embodiment of the present invention.

Referring to FIG. 3, the base station (eNB) 305 transmits to the terminal (UE) 310 the reference information (i.e., timer X, Y, and X and count threshold (THRES) information) for successful BCCH reception determination according to an embodiment of the present invention at step 315. Here, the reference information is provided to notify the UE of the information save timing for analyzing and saving BCCH reception failure reason. The reference information can be the time information for discriminating among PBCH reception failure, PDSCH reception failure, and PDCCH reception failure. The UE 310 sends an ACK/NACK to the eNB 305 to notify of whether the reference information has been received successfully at step 320. The reference information can be assigned to and stored in the UE 310 previously as a fixed value without steps 315 and 320. The eNB generates BCCH at step 325 and transmits the BCCH to the UE 310 at step 330. At this time, MIB is transmitted on the PBCH, and SIB is transmitted on the PDSCH resource informing of PDCCH. The eNB 305 transmits BCCH according to the preconfigured transmission parameters. At this time, the transmission parameters include at least one of BCCH transmission power and data rate such as coding rate.

At the time point when MIB and $N^{th}$ SIB are required, the UE 310 detects this requirement at step 335 and attempts receiving PBCH at step 340. If PBCH has been received successfully, the UE 310 stores the number of times received PDCCH successfully while receiving SIB in the form of log information. Afterward, if it is failed to receive BCCH in a predetermined time, the UE detects this at step 350 and saves BCCH reception failure reason, the number of successful PDCCH reception times, and time when the corresponding log information is recoded, as well as the previous log information at step 355. The BCCH reception failure reason and number of successful PDCCH reception times are described in detail afterward. If BCCH is not received, the UE 310 cannot attach to the eNB 305.

If the channel condition changes such that the UE 310 attaches to the eNB 305 successfully at step 360, the eNB 350 requests the UE 310 to report log information at step 365. The UE 310 transmits the retained information to the eNB 305 at step 370. If a specific condition triggering report is fulfilled, the UE 310 detects the condition fulfillment at step 375 and transmits the retained log information to the eNB. Afterward, the eNB 305 reconfigures the transmission parameters of PBCH, PDCCH, and PDSCH based on the received log information to optimize reception performance of the next BCCH at step 385. That is, if there is a problem to receive PBCH, the eNB 305 can increase transmission power of PBCH. If there is a problem to receive PDCCH, the eNB 305 can decrease the coding rate or increase the transmission power. If there is a problem to receive PDSCH, the eNB can adjust the Modulation and Coding Scheme (MCS) or increase the transmission power. In case that the failure probability is very low, the adjustment can be done in opposite manner.

As compare to other physical channels, PDCCH has low error requirement. If BCCH reception fails, the PDCCH reception failure is likely to be the reason. Accordingly, the PDCCH is managed with the number of successful PDCCH reception times included in the log information list. The number of successful PDCCH reception times is counted for a duration determined by a reception timer. The number of successful reception times can be used for determining PDCCH reception performance.

The system information transmission of BCCH is associated with three physical channels of PBCH, PDCCH, and PDSCH. Accordingly, the UE can acquire the system information with the successful reception of the physical channels. The error requirements of the respective physical channels differ from each other and managed by the eNB 305. For example, PBCH has high Forward Error Correction (FEC) performance with coding rate of 1/48 and repeats 4 times every 40 ms with the same information that can be combined. Although power boost and coding rate adjustment is possible in PDCCH, the retransmission technique such as HARQ is not adopted. In the SIB transmission on PDSCH, HARQ and Adaptive Modulation and Coding Scheme (AMC) are adopted. Accordingly, in spite of the same radio environment, the successful reception probability changes depending on the channel. If the UE 310 reports the failed physical channel to the eNB when BCCH reception fails, the eNB 305 can take action for improving reception performance of each channel. The log information can include current cell information, current location information, and neighbor cells' measurement information. Furthermore, the BCCH reception failure reason is transmitted along with the log information as follows.

ENUMERATED {MIB Failure, PDCCH Failure, SIB#N Failure}

Here, MIB failure indicates the case where MIB information is not acquired due to an error occurred in PBCH reception. PDCCH failure indicates the case where the address of the PDSCH resource carrying SIB information is not acquired due to an error in receiving PDCCH. SIB#N failure indicates that Nth SIB information is missing due to an error in receiving PDSCH.

Figure 4:
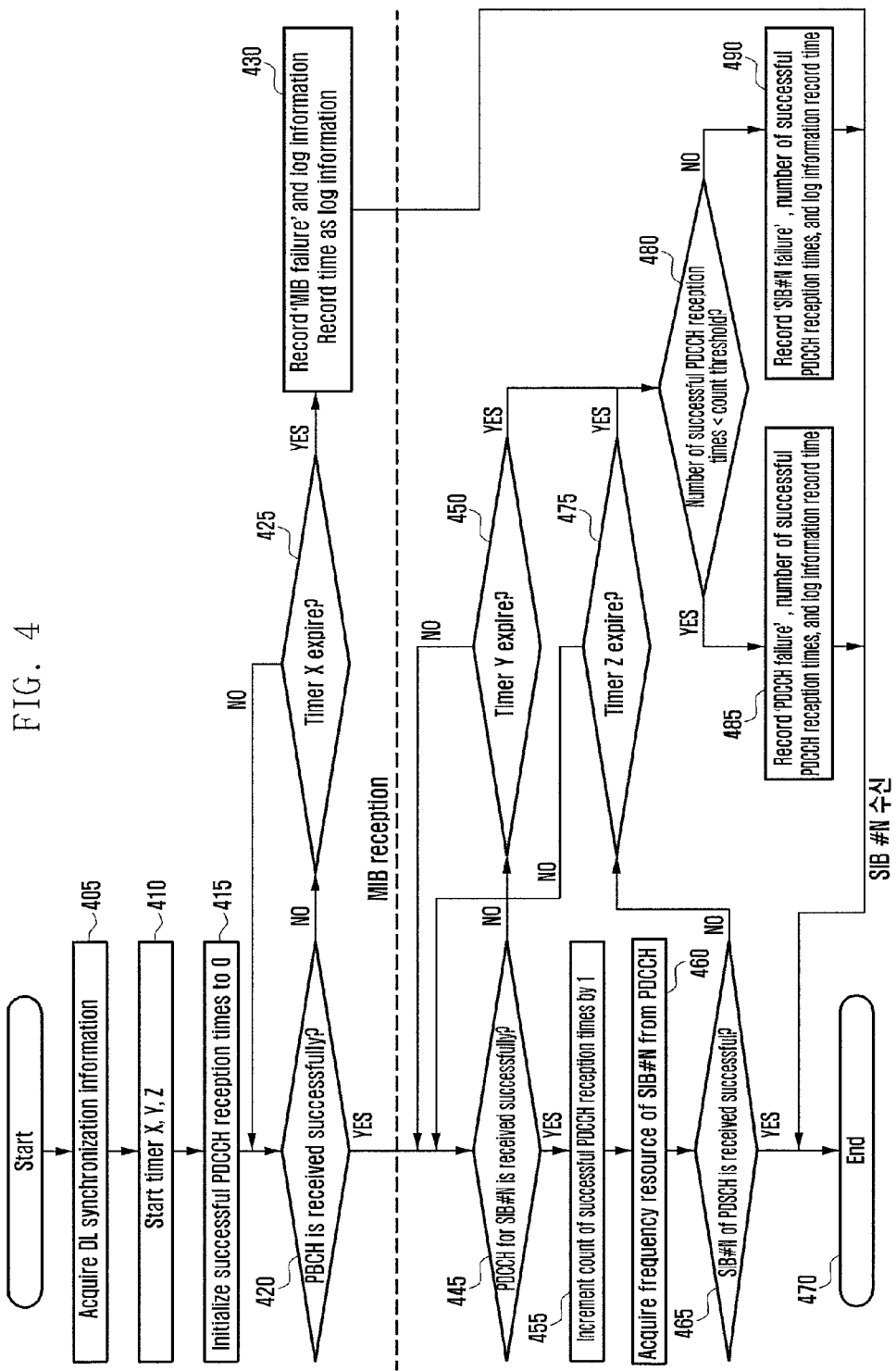
FIG. 4 is a flowchart illustrating the UE procedure according to the first embodiment of the present invention.

FIG. 4 is a flowchart illustrating the UE procedure according to the first embodiment of the present invention.

Referring to FIG. 4, the procedure of UE 310 can be divided into an MIB reception process and an SIB reception process.

After receiving synchronization information transmitted by the eNB 305 successfully at step 405, the UE 310 starts timers X, Y, and Z at step 410. At this time, the UE 310 can receive the reference information including the timers X, Y, and Z along with the synchronization information or has the preset timers X, Y, and Z. Here, the timers X, Y, and Z can be set to the same value or different values. The UE 310 initializes the successful PDCCH receipt counter (COUNT) to 0 that is stored as log information at step 415. If the PBCH is received successfully, the UE 310 detects the receipt of the PBCH at step 420 and attempts receipt of PDCCH based on the MIB information at step 435.

Otherwise, if the PBCH is not received, the UE 310 repeats steps 420 and 425 until the timer X expires at step 425. If it fails to receive PBCH before expiration of the timer X, the UE 310 saves the previous log information, MIB failure, and log information record time at step 430.

If the PBCH is received successfully, the UE 310 detects this at step 440 and attempts receiving PDCCH having $N^{th}$ SIB scheduling information at step 445. If PDCCH is received successfully, the UE 310 increment the successful PDCCH receipt counter by 1. Next, the UE 310 decodes the PDCCH to acquire the scheduling information on the frequency of $N^{th}$ SIB transmitted in PDSCH at step 460. Afterward, the UE 310 attempts receiving Nth SIB on PDSCH using the corresponding scheduling information at step 465. At this time, if it fails to acquire SIB#N from PDSCH, the UE repeats steps 445 to 465. If Nth SIB is received successfully, the UE ends the procedure.

Otherwise, if it fails to receive PDCCH until the timer Y expires at step 450, the UE determines the BCCH receipt failure reason based on previously stored count value of the successful PDCCH receipt times at step 480. That is, the UE 310 compares the count value of the successful PDCCH receipt times with a predetermined count threshold value. If the count value of the successful PDCCH receipt times is less than the predetermined count threshold value, the UE 310 determines that a problem has occurred in receiving PDCCH and stores the PDCCH failure and successful PDCCH receipt times count value, and log information record time in the form of log information at step 485. If the successful PDCCH receipt times count value is equal to or greater than the predetermined count threshold value, the UE 310 determines that a problem has occurred in receiving PDSCH and stores SIB#N failure information indicating $N^{th}$ SIB receipt failure, successful PDCCH receipt times count value, and log information record time at step 490.

Figure 5:
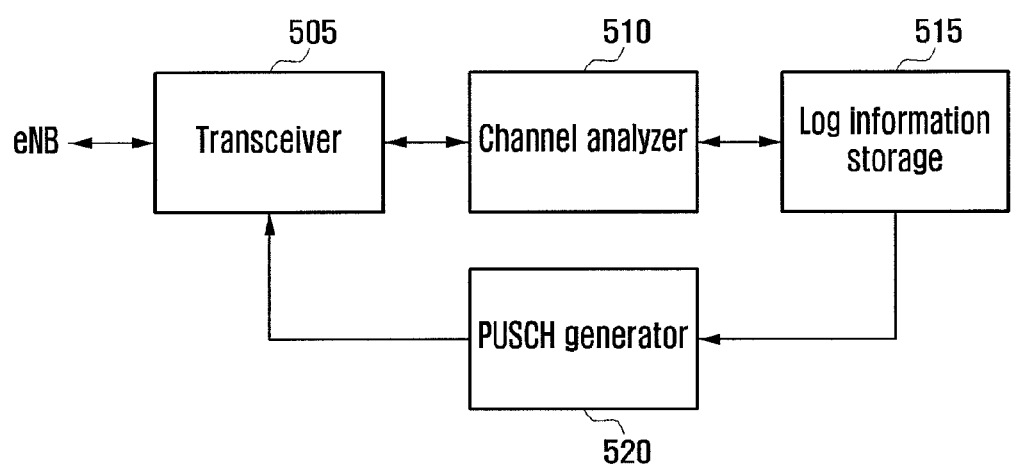
FIG. 5 is a block diagram illustrating a configuration of the UE according to the first embodiment of the present invention.

FIG. 5 is a block diagram illustrating a configuration of the UE according to the first embodiment of the present invention.

Referring to FIG. 5, the UE includes a transceiver 505, a channel analyzer 510, a log information storage 515, and a PUSCH generator 520. The transceiver 505 receives physical channels including PBCH, PDCCH, and PDSCH. The channel analyzer 510 decodes the physical channels into necessary information. At this time, the channel analyzer 510 acquires MIB information from PBCH, SIB scheduling information from PDCCH, and SIB information from PDSCH. If it is failed to receive the physical channels until the timer expire, the channel analyzer 510 checks the physical channel(s) failed in reception and stores the result in the log information storage 515. After the communication between the UE 310 and the eNB 305 is normalized, the PUSCH generator 520 generates and transmits PUSCH including log information such as BCCH receipt failure reason and successful PDCCH receipt time count value to the eNB 305 in response to the request from the eNB 305 or when a specific condition is fulfilled.

Figure 6:
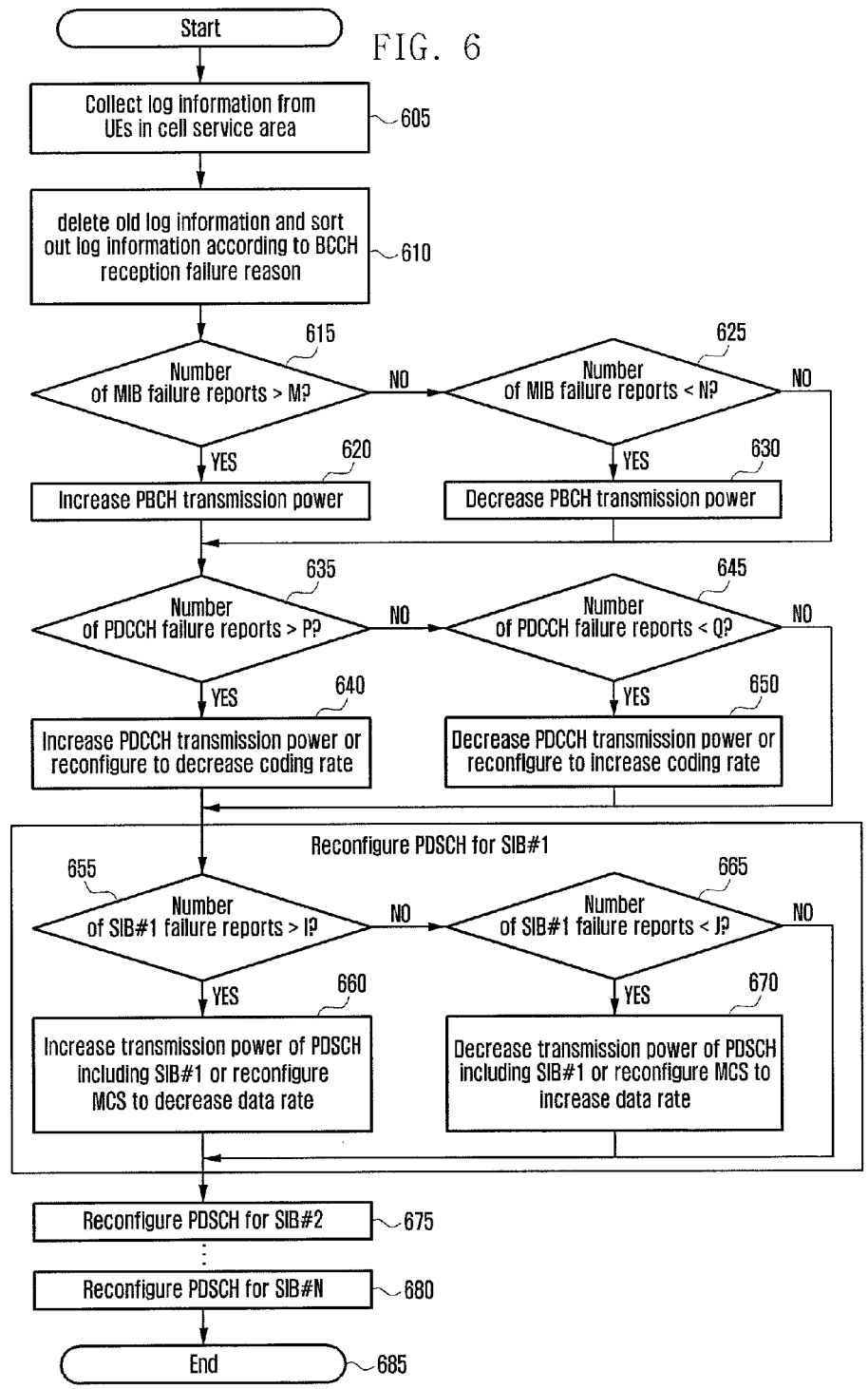
FIG. 6 is a flowchart illustrating eNB procedure according to the first embodiment of the present invention.

FIG. 6 is a flowchart illustrating eNB procedure according to the first embodiment of the present invention.

Referring to FIG. 6, the eNB 305 collects log informations from the UEs 310 within the service area of the cell at step 605. Next, the eNB 305 deletes the too old log information based on the record times of the log informations and checks the BCCH receipt failure reasons of the rest log informations at step 610. If the number of MIB failure report times is greater than M at step 615, the eNB 305 increases the transmission power of PBCH at step 620. If the number of MIB failure report times is less than N at step 625, the eNB 605 decreases the transmission power of PBCH at step 630. Next, if the number of PDCCH failure report times is greater than P at step 635, the eNB 305 increases the transmission power of PDCCH or decreases the coding rate at step 640. If the number of PDCCH failure report times is less than Q at step 645, the eNB 305 decreases the transmission power of PDCCH or increases the coding rate at step 650. Next, if the number of SIB#1 failure report times is greater than I at step 655, the eNB 305 increases the transmission power of SIB#1 or adjusts the MCS for lower data rate at step 660. If the number of SIB#N failure report times is less than J at step 665, the eNB 305 decreases the transmission power of SIB#N or adjusts MCS for higher data rate at step 670. Afterward, the eNB can perform re-configuration of PDSCH for SIB#N individually through steps 675 to 680, and the same re-configuration can be applied to all the SIBs.

Figure 7:
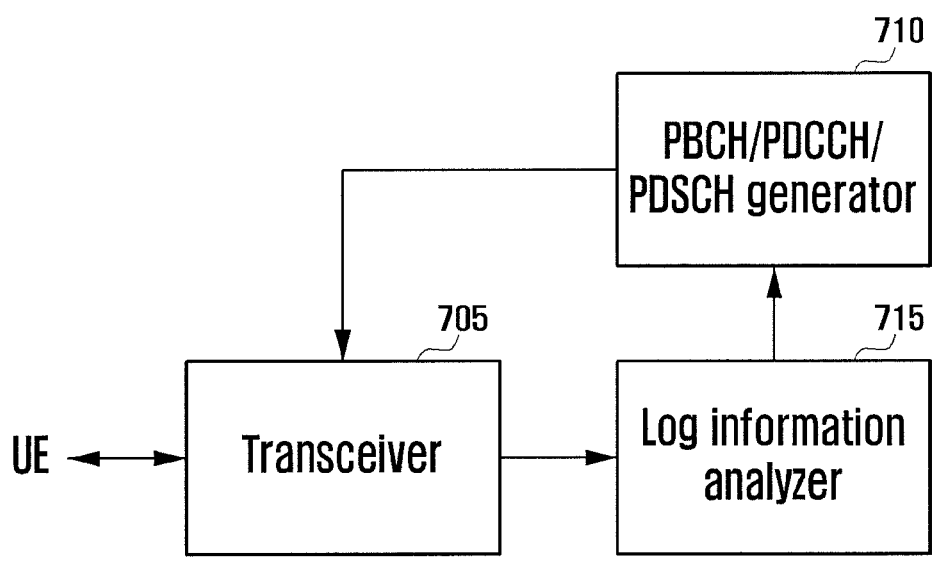
FIG. 7 is a block diagram illustrating a configuration of the eNB according to the first embodiment of the present invention.

FIG. 7 is a block diagram illustrating a configuration of the eNB according to the first embodiment of the present invention.

Referring to FIG. 7, the eNB includes a transceiver 705, a PBCH/PDCCH/PDSCH generator 710, and a log information analyzer 715. The transceiver 705 receives log information from the UE 310. The log information analyzer 715 analyzes the log information. At this time, the log information analyzer 715 checks the BCCH receipt failure reason (such as MIB failure, PDCCH failure, and SIBx failure) included in the log information. The PBCH/PDCCH/PDSCH generator 710 adjusts the parameters related to the respective physical channels the transmission parameters, i.e. the transmission parameters, according to the BCCH reception failure reason. Since the transmission parameters that can be adjusted per physical channel have been described already, the detailed descriptions thereon are omitted herein.

Second Embodiment

If taking a new record time point and log information into consideration in addition to those of the first embodiment, it improves BCCH reception performance optimization. As for PBCH, the PBCH having the same information repeats 4 times in 40 ms and, the repeated informations can be combined. For example, although it has failed to receive the first PBCH, it is possible to acquire MIB information by decoding the next PBCH or combining the next PBCH with the first PBCH in the period of 40 ms. The PDSCH can be used to retransmit SIB with HARQ technique which does not us feedback information. The same SIB can be transmitted repeatedly in the range referred to as SI-Window. Although it fails to decode the first packet, it is possible to increase the reception performance by combining the first packet with the packets following. The combining technique for improving the reception performance can be used as a criteria for determining channel reception performance in the current radio environment. It can be said that, as the number of combinations performed before successful decoding increases, the channel reception performance decreases. Accordingly, by notifying of the number of combinations in the log information it is possible to improve the channel performance with increase of transmission power and ANC adjustment based thereon. In the second embodiment, a new information record time point is defined.

Figure 8:
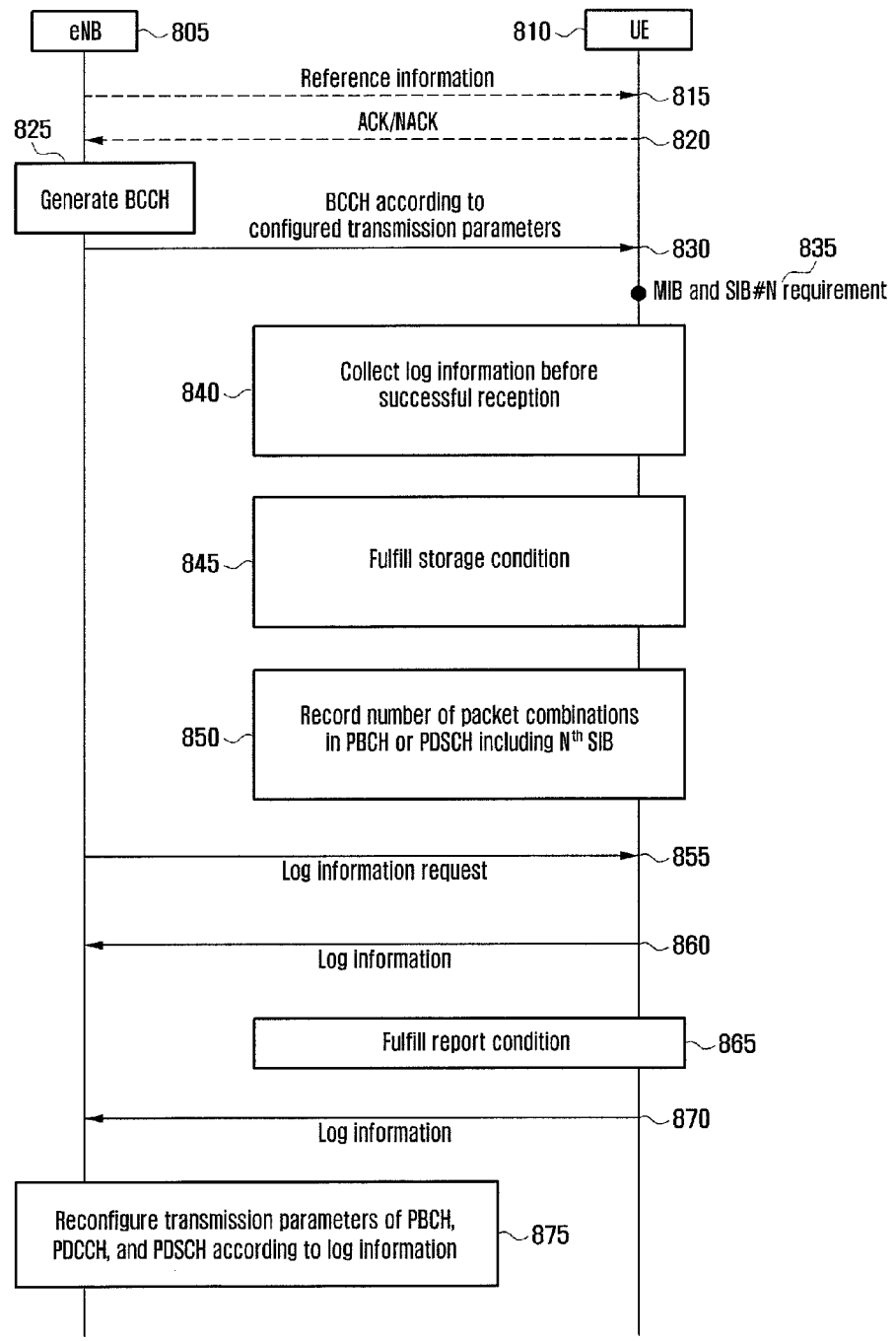
FIG. 8 is a signaling diagram illustrating entire procedure according to the second embodiment of the present invention.

FIG. 8 is a signaling diagram illustrating entire procedure according to the second embodiment of the present invention.

Referring to FIG. 8, the eNB 805 transmits the reference information, i.e. reference threshold values X1 and X2, for use in determining successful receipt of BCCH according to an embodiment of the present invention at step 815. Here, the reference information is of providing the information save time point for saving the number of packet combination times for the UE 810 to receive BCCH. That is, the reference information can be the information on the conditions for recording the number of packet combination times as log information. The UE 810 sends ACK/NACK to notify the eNB 805 of whether the reference information is received successfully at step 820. The UE 810 can have the reference information stored previously as fixed value without steps 815 and 820. The eNB 805 generates BCCH at step 825 and transmits the BCCH to the UE 810 at step 830. At this time, the MIB is transmitted on PBCH, and the SIB on PDSCH resource indicated in the PDCCH. The eNB 805 transmits the BCCH according to the pre-configured transmission parameters. At this time, the transmission parameters includes at least one of transmission power of BCCH and data rate such as coding rate.

Next, at the time point when MIB or Nth SIB becomes necessary, the UE 810 detects the necessity at step 835 and receives PBCH or PDSCH carrying SIB#N and save the number of packet combination times until the PBCH or PDSCH is received successfully as log information at step 840. Since the combination technique is applied to PBCH and PDSCH, the UE can store the number of packet combination times of the corresponding channel as log information. The UE 810 also can store the numbers of packet combination times of both the PBCH and PDSCH. If the number of packet combination times until PBCH or PDSCH is received successfully is greater than $X_1$ or less than $X_2$, the UE 810 detects this at step 845 and stores the number of packet combination times as log information at step 850.

Next, if the eNB 805 requests for log information at step 855, the UE 810 transmits the corresponding log information to the eNB 805 at step 860. If a specific condition is fulfilled at step 865, the UE 810 transmits corresponding log information to the eNB 805 at step 870. Afterward, the eNB 805 performs reconfiguration by adjusting the transmission power to optimize the PBCH or PDSCH reception performance based on the log information at step 875. For example, if the number of PBCH packet combination times is greater than $X_1$, the eNB 805 determines bad reception performance and thus increases the transmission power. If the number of packet combination times is less than $X_2$, the eNB 805 determines good reception performance and thus increases the transmission power. In case of PDSCH, it is possible to adjust MSC as well as the transmission power.

Figure 9:
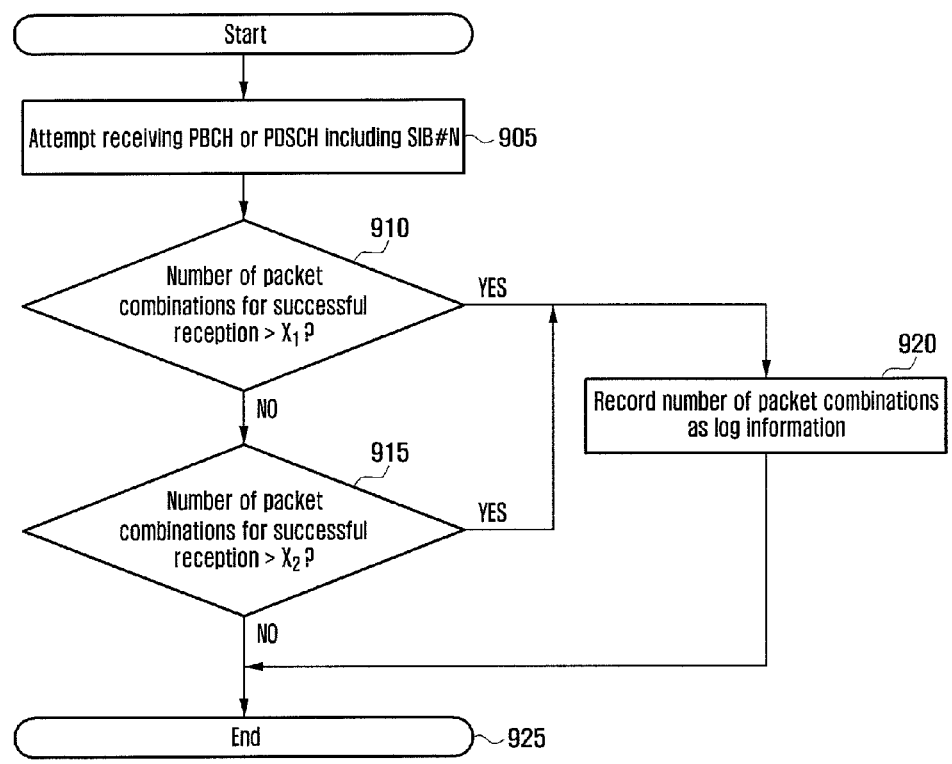
FIG. 9 is a flowchart illustrating UE procedure according to the second embodiment of the present invention.

FIG. 9 is a flowchart illustrating UE procedure according to the second embodiment of the present invention.

Referring to FIG. 9, the UE 810 attempts receiving PBCH at step 905. Next, the UE 810 determines whether the number of packet combination times before the successful receipt of PBCH is greater than $X_1$ at step 910. The UE 810 also determines whether the number of packet combination times before the successful receipt of PBCH is less than $X_2$ at step 915. If it is determined that the number of packet combination times is greater than $X_1$ or less than $X_2$, the UE 810 save the number of packet combination times as log information at step 920. This is applied to the PDSCH. If there is a request from the eNB 805 or a specific condition is satisfied, the UE 810 transmits the corresponding log information to the eNB 805.

Figure 10:
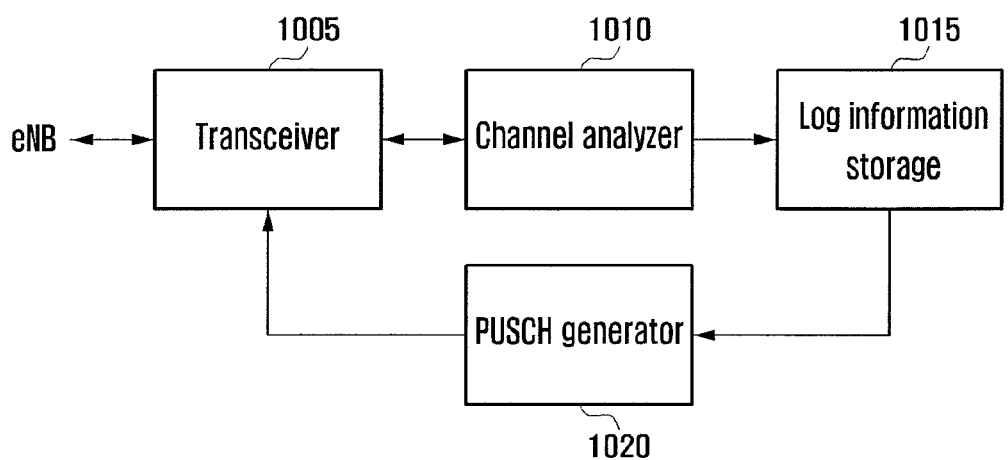
FIG. 10 is a block diagram illustrating a configuration of the UE according to the second embodiment of the present invention.

FIG. 10 is a block diagram illustrating a configuration of the UE according to the second embodiment of the present invention.

Referring to FIG. 10, the UE includes a transceiver 1005, a channel analyzer 1010, a log information storage 1015, and a PUSCH generator 1020. The transceiver 1005 receives the physical channels including PBCH and PDSCH. The channel analyzer 1010 counts the number of packet combination times until the physical channels are received successfully. If the number of packet combination times is greater than $X_1$ or less than $X_2$, the channel analyzer stores the number of packet combination times in the log information storage 1015. If there is a request from the eNB 805 or a specific condition is fulfilled, the PUSCH generator 1020 transmits PUSCH including the log information to the eNB 805 by means of the transceiver 1005.

Figure 11:
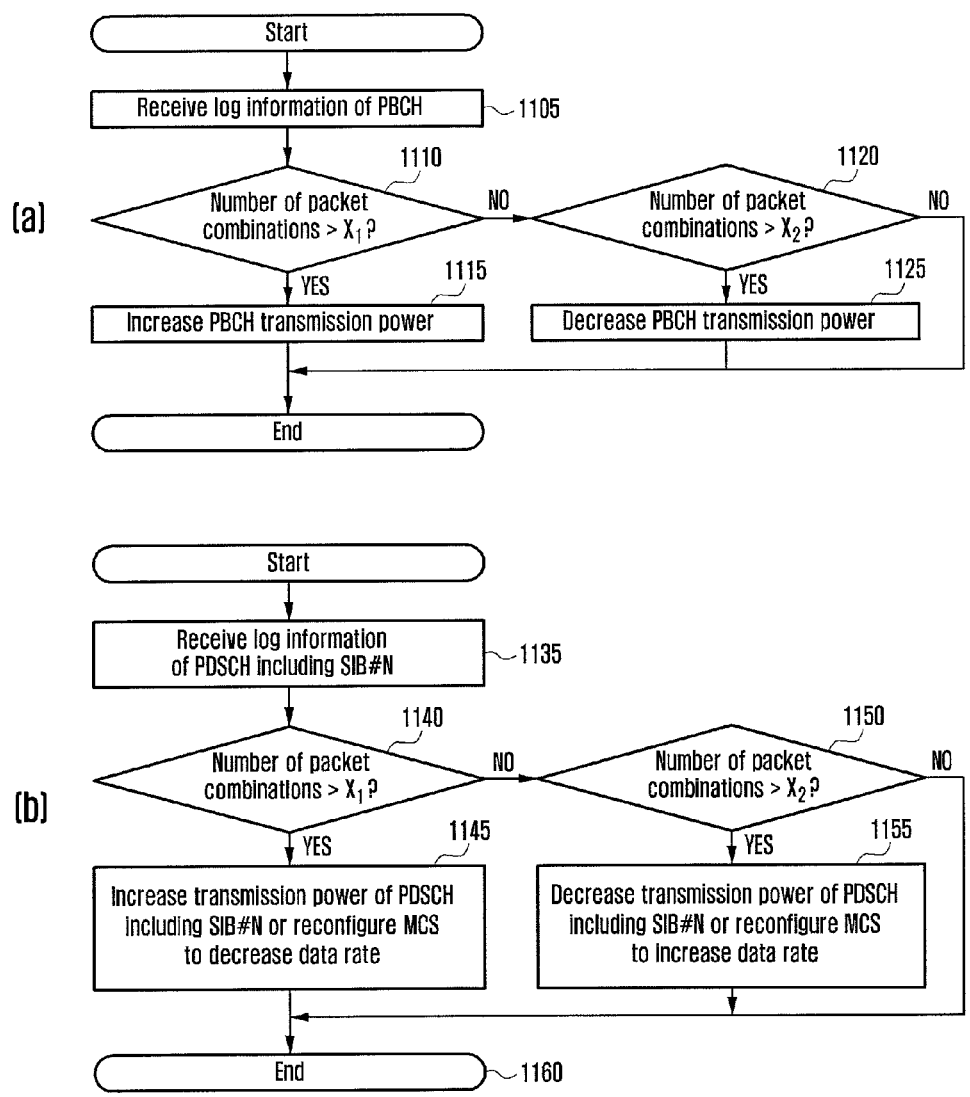
FIG. 11 is a flowchart illustrating eNB procedure according to the second embodiment of the present invention.

FIG. 11 is a flowchart illustrating eNB procedure according to the second embodiment of the present invention.

Referring to FIG. 11, the eNB receives the log information including the number of packet combination times of PBCH or the number of packet combination time of PDSCH carrying SIB#N from the UE. Part (a) of FIG. 11 is directed to the case where the eNB receives the number of packet combination times of PBCH. Part (b) of FIG. 11 is directed to the case where the eNB receives the number of packet combination times of PDSCH.

As shown in part (a) of FIG. 11, the eNB 805 receives the number of packet combination times at step 1105. At this time, if the number of packet combination times is greater than $X_1$ at step 1110, the eNB 805 increases the transmission power of PBCH. Otherwise, if the number of packet combination times is less than $X_2$ at step 1120, the eNB 805 decreases the transmission power of PBCH at step 1125.

As shown in part (b) of FIG. 11, the eNB 805 receives the number of packet combination times of PDSCH at step 1140. At this time, if the number of packet combination times is greater than $X_1$ at step 1140, the eNB 805 increases the transmission power of PDSCH or changes MCS to decrease data rate at step 1145. If the number of packet combinations times is less than $X_2$ at step 1150, the eNB 805 decreases the transmission power of PDSCH or changes MCS to increase data rate at step 1155. At this time, the values $X_1$ and $X_2$ for PBCH or PDSCH can be chanted.

Figure 12:
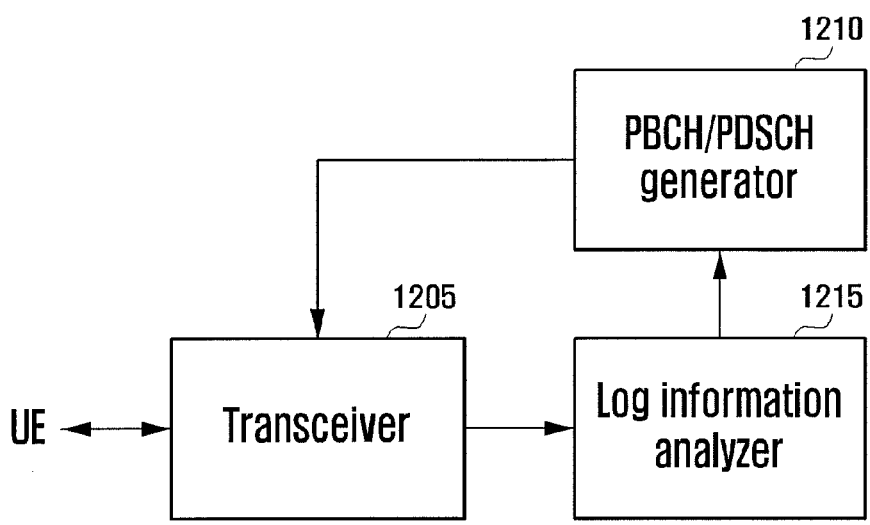
FIG. 12 is a block diagram illustrating a configuration of the eNB according to the second embodiment of the present invention.

FIG. 12 is a block diagram illustrating a configuration of the eNB according to the second embodiment of the present invention.

Referring to FIG. 12, the eNB includes a transceiver 1205, a PBCH/PDSCH generator 1210, and a log information analyzer 1215. The transceiver 1205 receives log information from the UE 810. The log information analyzer 1215 analyzes the log information. At this time, the log information analyzer 1215 determines whether the channel state is good or bad based on the number of packet combination times. The PBCH/PDSCH generator 1210 adjusts the parameters related to the physical channels, i.e. transmission parameters, according to the channel state. That is, the PBCH/PDSCH generator 1210 reflects the channel state to increase/decrease the transmission power for PBCH and can adjust MCS as well as the transmission power for PDSCH.

Third Embodiment

After reception failure of BCCH from an eNB, the UE may moves to another eNB. at this time, the UE retains the log information associated with the previous eNB. After moving to another eNB, if the communication is normalized, the UE reports the log information related to the old eNB to the new eNB. Since the log information includes basic cell information, the current eNB can check whether the log information is of itself. Although the log information related to other eNB can be discarded, this information may be useful to neighbor eNBs, if it is possible to forward the information the neighbor eNBs. The log information exchange between eNBs according to this scenario is described in the third embodiment.

Figure 13:
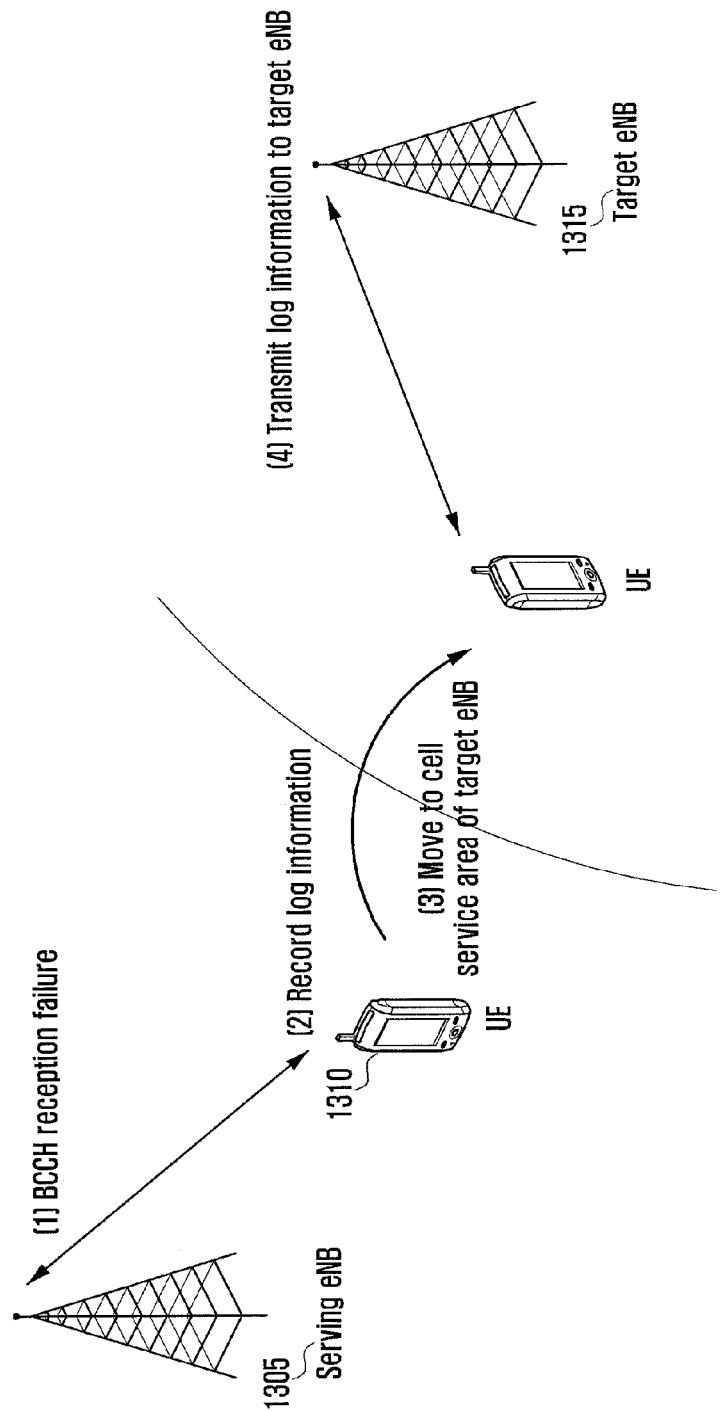
FIG. 13 is a diagram illustrating a scenario requiring log information exchange among eNBs.

FIG. 13 is a diagram illustrating a scenario requiring log information exchange among eNBs.

Referring to FIG. 13, the first eNB 1305 transmits BCCH. The UE 1310 located in the service are of the first eNB fails receiving BCCH and stores log information. Afterward, the UE 1310 moves to enter the service area of the second eNB 1315. After it becomes possible to communicate with the second eNB 1315, the UE 1310 transmits the stored log information to the second eNB 1315. At this time, the log information is associated with the first embodiment 1305 as a neighbor eNB of the second eNB 1315.

Figure 14:
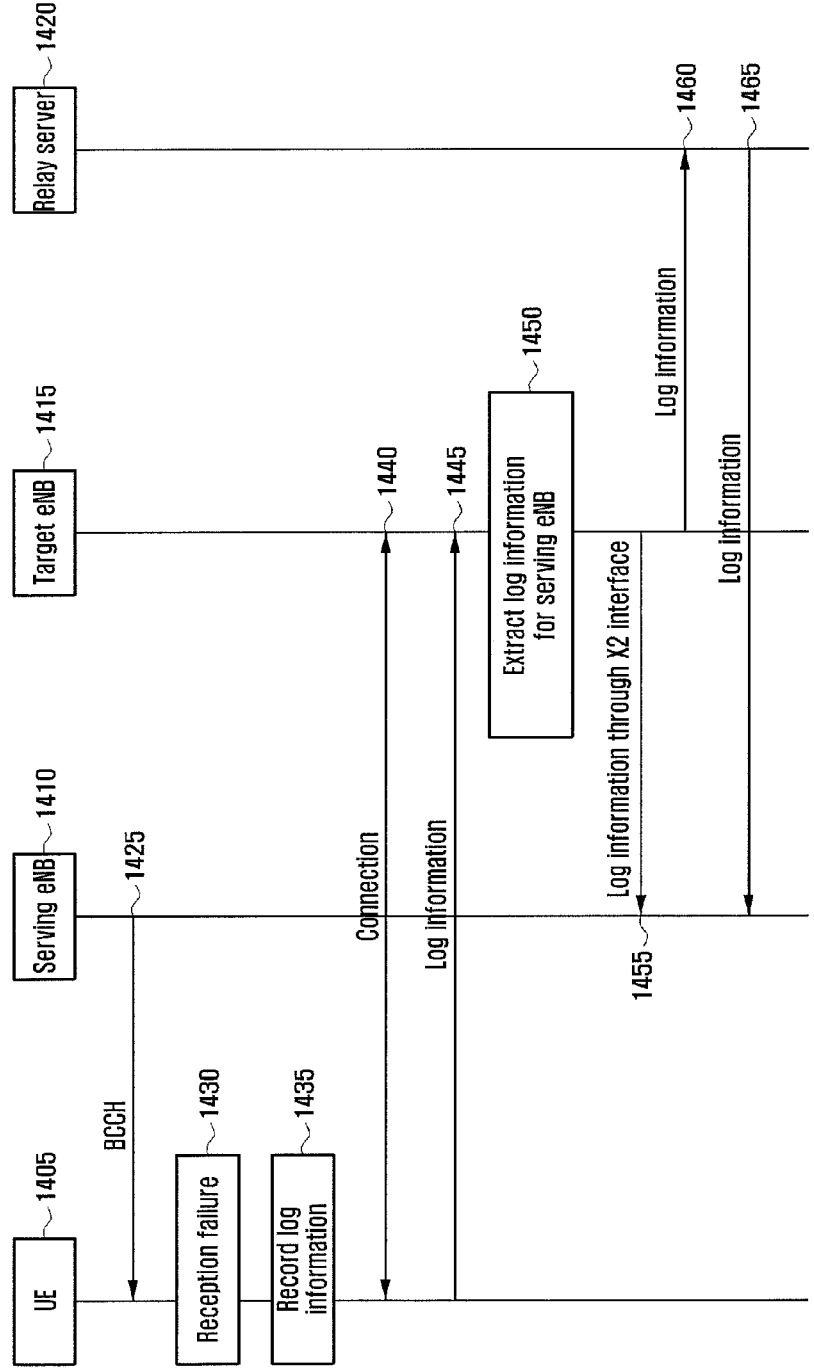
FIG. 14 is a signaling diagram illustrating a procedure for exchanging log information between eNBs.

FIG. 14 is a signaling diagram illustrating a procedure for exchanging log information between eNBs.

Referring to FIG. 14, the first eNB transmits BCCH to the UE 1405 at step 1425. If it fails to receive BCCH at step 1430, the UE 1405 records the log information at step 1435. Afterward, if the UE 1405 moves to connects to the second eNB 1415 as a neighbor eNB of the first eNB 1410, the UE reports the log information to the second eNB 1415 at step 1445.

Upon receipt of the log information, the second eNB 1415 checks the cell information to verify that the log information relates to the first eNB 1410 at step 1450. If there exists an X2 interface between the first and second eNBs 1410 and 1415, the second eNB 1415 transmits the corresponding log information to the first eNB 1410 via the X2 interface at step 1455. If there exist no X2 interface between the first and second eNBs 1410 and 1415, the second eNB 1415 transmits the corresponding log information to the relay server 1420. Typically, the relay server 1420 can communicate with all of the eNBs 1410 and 1415. Here, the relay server 1420 can be a SON server and implemented in the form of a mobile communication system entity such as Mobility Management Entity (MME). The relay server 1420 forwards the corresponding log information to the first eNB 1410 based on the cell information included in the log information at step 1465.

Figure 15:
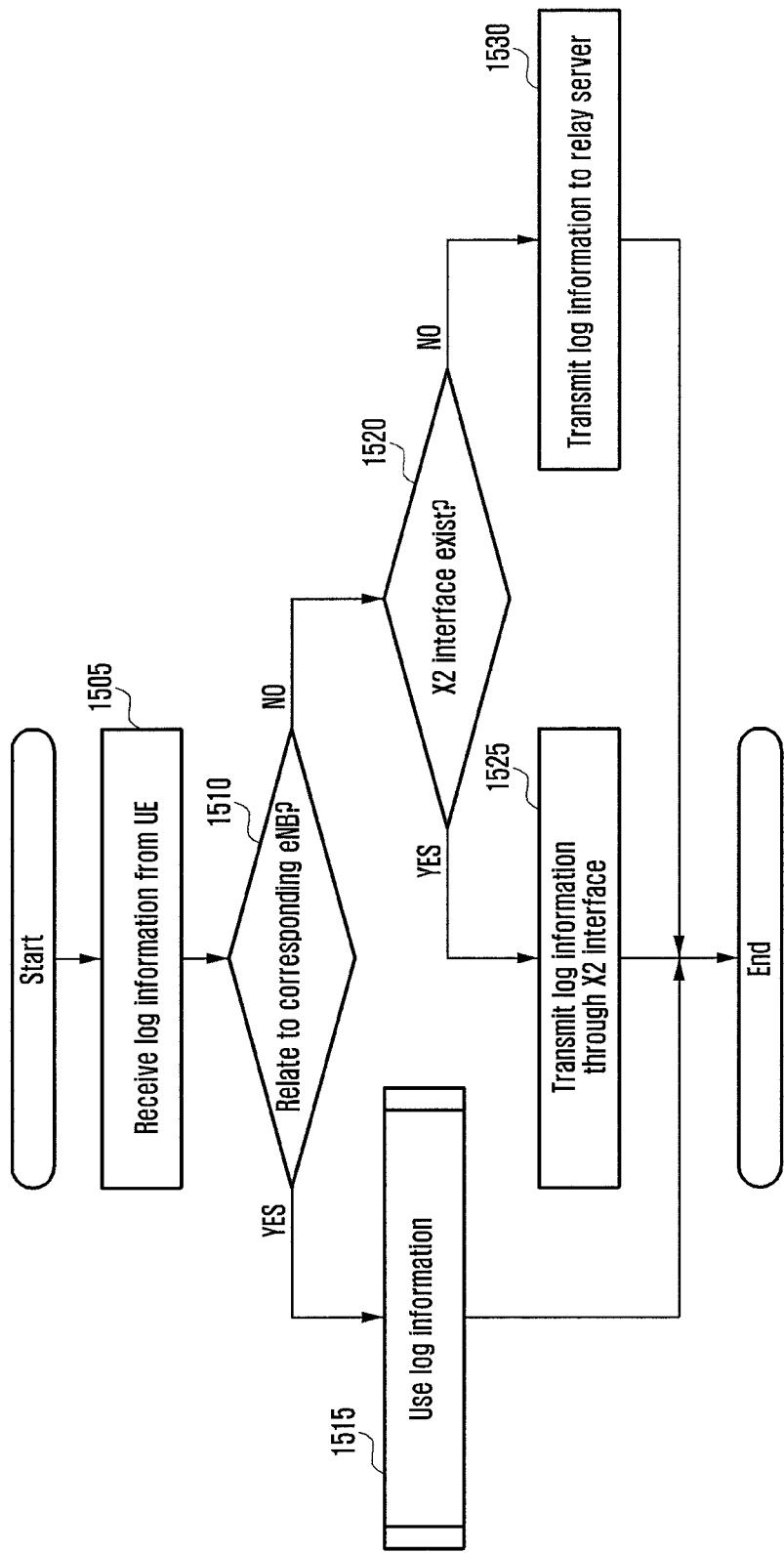
FIG. 15 is a flowchart illustrating eNB procedure according to the third embodiment of the present invention.

FIG. 15 is a flowchart illustrating eNB procedure according to the third embodiment of the present invention.

Referring to FIG. 15, if the log information is received from the UE 1405, the eNB 1410 (or 1415) detects the receipt of the log information at step 1505 and checks the cell information included in the log information at step 1510. If it is determined that the log information is of the corresponding eNB through the cell information, the eNB 1410 (or 1415) performs the procedure according to one of the first and second embodiment to optimize the transmission parameters at step 1515. Otherwise, if it is determined that the log information is not of the corresponding eNB 1410 (or 1415), the eNB 1410 (or 1415) determines whether there exists X2 interface connecting to another eNB at step 1520. If it is determined that there exists X2 interface connecting to another eNB, the eNB 1410 (or 1415) transmits the log information to the other eNB directly through the X2 interface at step 1525 and, otherwise, to the relay server 1420 at step 1530.

While the invention is described in terms of some specific examples and embodiments, it will be clear that this invention is not limited to these specific examples and embodiments and that many changes and modified embodiments will be obvious to those skilled in the art without departing from the true spirit and scope of the invention.

What is claimed is:

1. A broadcast control channel transmission method of a base station, the method comprising:
    transmitting a broadcast control channel according to preconfigured transmission parameters;
    receiving, from a terminal, log information recorded at the terminal and comprising information indicating whether the broadcast control channel is received by the terminal successfully and a time when the log information is recorded;
    reconfiguring the transmission parameters according to the log information; and
    transmitting the broadcast control channel based on the reconfigured transmission parameters.

2. The method of claim 1, wherein the log information comprises at least one of broadcast control channel reception failure reason, a number of successful receipts of downlink control channel for receiving the broadcast control channel, and a number of packet combinations for receiving the broadcast control channel.

3. The method of claim 1, wherein the transmission parameters comprises at least one of transmission power of the broadcast control channel and a data rate.

4. The method of claim 2, further comprising transmitting at least one of time information for identifying the reception failure reason and information on conditions for determining whether the number of packet combinations is recorded, as reference information for determining whether the broadcast control channel is received successfully.

5. A broadcast control channel transmission apparatus of a base station, the apparatus comprising:
    a broadcast control channel generator for generating a broadcast control channel according to preconfigured transmission parameters;
    a transceiver for transmitting the broadcast control channel and receiving, from a terminal, log information recorded by the terminal and indicating whether the broadcast control channel is received by the terminal successfully and a time when the log information is recorded; and
    a log information analyzer for collecting and analyzing the log information to reconfigure the transmission parameters;
    wherein the transceiver is further configured to transmit the broadcast control channel based on the reconfigured transmission parameters.

6. The apparatus of claim 5, wherein the log information comprises at least one of broadcast control channel reception failure reason, a number of successful receipts of downlink control channel for receiving the broadcast control channel, and a number of packet combinations for receiving the broadcast control channel.

7. The apparatus of claim 5, wherein the transmission parameters comprises at least one of transmission power of the broadcast control channel and a data rate.

8. The apparatus of claim 6, further comprising transmitting at least one of time information for identifying the reception failure reason and information on conditions for determining whether the number of packet combinations is recorded, as reference information for determining whether the broadcast control channel is received successfully.

9. A broadcast control channel reception method of a terminal, the method comprising:
    recording, when a broadcast control channel transmitted by a base station according to preconfigured transmission parameters is received by the terminal, log information indicating whether the broadcast control channel is received by the terminal successfully and a time when the log information is recorded;
    feeding back the log information to the base station by analyzing the log information to reconfigure the transmission parameters; and
    receiving the broadcast control channel transmitted by the base station according to the reconfigured transmission parameters.

10. The method of claim 9, wherein the log information comprises at least one of broadcast control channel reception failure reason, a number of successful receipts of downlink control channel for receiving the broadcast control channel, and a number of packet combinations for receiving the broadcast control channel.

11. The method of claim 9, wherein the transmission parameters comprises at least one of transmission power of the broadcast control channel and a data rate.

12. A broadcast control channel reception apparatus of a terminal, the apparatus comprising:
    a channel analyzer for determining, when a broadcast control channel transmitted by a base station according to preconfigured transmission parameters is received by the terminal, whether the broadcast control channel is received by the terminal successfully;
    a log information storage for recording at the terminal log information according to whether the broadcast control channel is received by the terminal successfully and a time when the log information is recorded; and
    a transceiver for receiving the broadcast control channel and analyzing and feeding back the log information to the base station for reconfiguration of the transmission parameters,
    wherein the transceiver is further configured to receive the broadcast control channel based on the reconfigured transmission parameters.

13. The apparatus of claim 12, wherein the log information comprises at least one of broadcast control channel reception failure reason, a number of successful receipts of downlink control channel for receiving the broadcast control channel, and a number of packet combinations for receiving the broadcast control channel.

14. The apparatus of claim 12, wherein the transmission parameters comprises at least one of transmission power of the broadcast control channel and a data rate.

15. The apparatus of claim 13, wherein the channel analyzer stores at least one of time information for discriminating among the reception failure reasons and condition information for determining whether the number of packet combinations for receiving the broadcast control channel is recorded.

* * * * *